G. N. WIDENHOFER.
COMBINED RESILIENT TIRE AND MOUNTING.
APPLICATION FILED SEPT. 15, 1919.
1,354,363.
Patented Sept. 28, 1920.
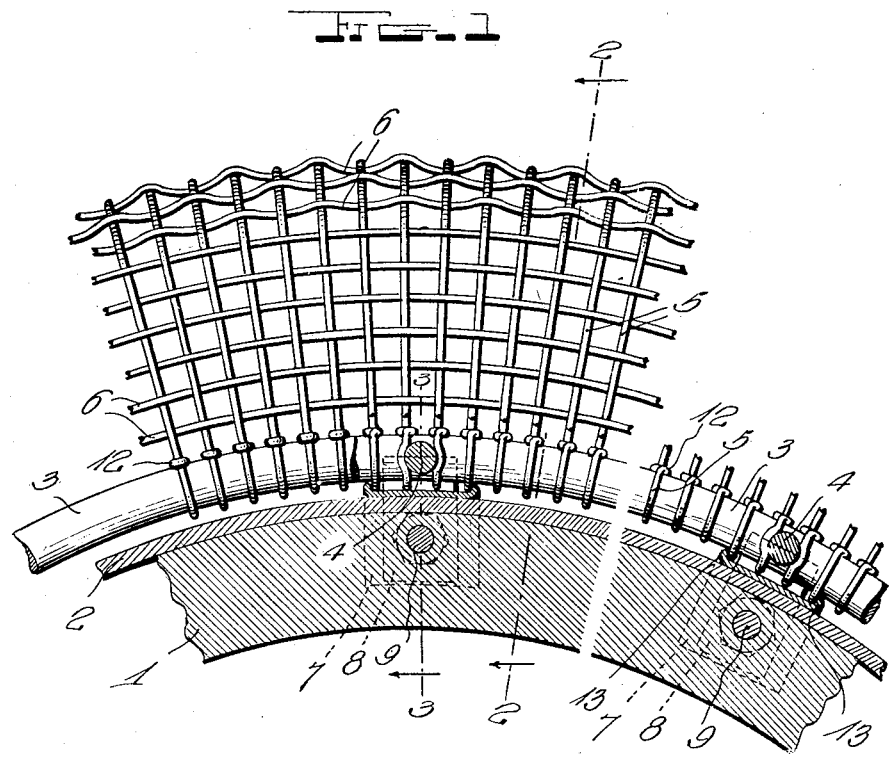
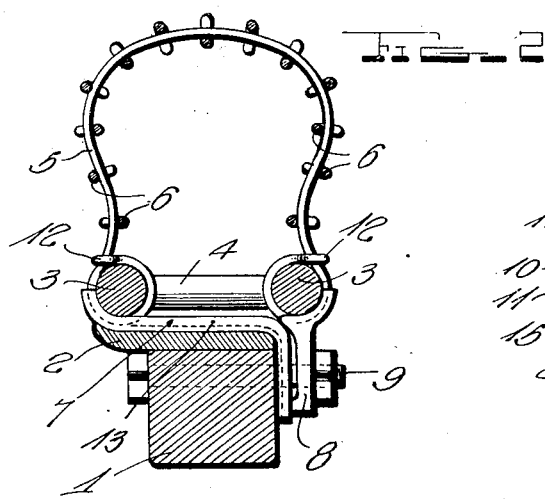
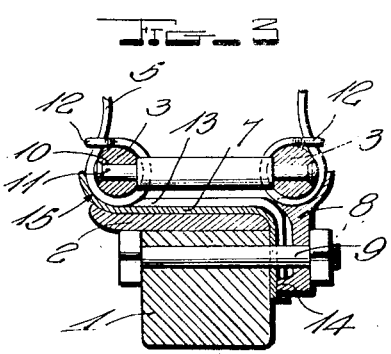
Witness
Inventor
Gilbert N. Widenhofer
By
Attorneys

UNITED STATES PATENT OFFICE.

GILBERT N. WIDENHOFER, OF BUTLER, PENNSYLVANIA.

COMBINED RESILIENT TIRE AND MOUNTING.

1,354,363.

Specification of Letters Patent.   Patented Sept. 28, 1920.

Application filed September 15, 1919. Serial No. 323,713.

*To all whom it may concern:*

Be it known that I, GILBERT N. WIDENHOFER, a citizen of the United States, residing at Butler, in the county of Butler and State of Pennsylvania, have invented certain new and useful Improvements in Combined Resilient Tires and Mountings; and I do declare the following to be a full, clear, and exact description of the invention, such as will enable others skilled in the art to which it appertains to make and use the same.

This invention relates to tire mountings, and it relates more specifically to an improved combined resilient tire and mounting.

One object of the invention is to generally improve upon devices of this character by providing an improved structure which includes a resilient tire and a mounting therefor which is easily attachable to wheel-rims of ordinary construction.

Other objects and advantages may become apparent to persons who read the following details of description in connection with the accompanying drawings in which:—

Figure 1 is a view illustrating a portion of a wheel and tire, a part of the tire being shown in full elevation, and another part being shown in vertical section, the wheel felly and rim being in vertical section, and two of the seat members being in vertical section.

Fig. 2 is a sectional view, the section being taken along the line 2—2 of Fig. 1.

Fig. 3 is a sectional view, a portion of the tire being broken off, the section being taken along the line 3—3 of Fig. 1.

Referring to these drawings in detail in which similar reference characters correspond with similar parts throughout the several views, and in which the felly 1 and rim 2 may be of any ordinary or well known construction,— a complete wheel and tire constructed according to this invention includes a pair of bead-rings 3, a series of spacing bars or struts 4, a series of bowed and looped wires 5, a series of annular wires 6, a series of seat members 7, a second series of seat members 8 and a series of securing bolts 9.

The rings 3 are preferably formed of spring steel, being circular in cross section (as shown), and provided with apertures 10 through which extend reduced portions 11, of the spacing bars 4, these reduced portions being formed with heads at their outer ends to prevent spreading or separating of the rings 3. Therefore, these bead-rings are held rigidly in spaced parallel relation to one another.

The wires 5 and 6 are preferably formed of spring steel and are interwoven and may be electrically welded at each crossing. Moreover, the looped end portions 12 of the wires 5 embrace the rings 3 at spaced intervals, and these loops are electrically welded or otherwise fixed in their spaced relation on the rings 3.

Each seat member 7 is preferably formed of channel beam, each of these members having flanges 13 at two opposite edges, these flanges providing shoulders between which an element 14 of the seat member 8 is confined so as to coöperate with the bolt 9 in preventing movement of the member 8 with relation to the member 7. Moreover, each of the members 7 extends across the rim 2 and has one end curved upward and outward so that curved grooves 15 are provided at the bases of the flanges 13, these grooves constituting seats for the ring-embracing portions or loops 12 which are contiguous to these flanges. Similarly curved grooves are provided in the seat members 8 and constitute seats for the adjacent parts of the wires 5. It will be understood, however, that only a comparatively few of the portions 12 are contiguous to or seated in the grooves or seats 15, the majority of the elements 12 being supported solely by the rings 3. It will be seen, therefore, that the resiliency of the tire is not totally dependent upon the intermeshing wires 5 and 6, but that the rings or bead elements 3 also impart resiliency to the tire.

A number of the wires 5 have their loops, around the beads or rings 3, seated against opposite sides of the cross-bars 4, so that these cross-bars co-act with these loops and the contiguous seats to prevent circumferential shifting of the beads or rings through the loops in case they are fixed to the beads by means less secure than electric welding.

From the foregoing description, it will be seen that it is impossible for a tire of this character to creep, and that the tread surface is inherently a non-skid device.

Although I have described this embodiment of my invention very specifically, it is not intended to limit this invention to these exact details of construction and arrangement of parts, but changes may be made within the scope of the inventive ideas as implied and claimed.

What I claim as my invention is:—

1. In a wheel structure, a pair of spaced rings constituting bead elements, spacing means extending from one to the other of said rings and united therewith to hold them in their spaced relation to one another, a resilient tire-structure including wires which are looped around the bead elements to secure this resilient structure to the bead elements, a set of seat members each provided with a depressed seat to receive at least one of the loops of said wires and co-act therewith to prevent the contiguous bead element from shifting circumferentially, and a second set of seat members each provided with a depressed seat to receive at least one loop of the said wires and co-act therewith to prevent the other bead element from shifting circumferentially, and means to secure the seat members of one set to those of the other set in such relation that they co-act to prevent lateral shifting of the bead elements.

2. In a wheel structure, a pair of bead elements, spacing bars having their ends secured to the bead elements to hold them properly spaced from one another, wires, having loops embracing the respective bead elements, a set of seat members adapted to extend across the periphery of a wheel-rim and support one of said bead elements on the wheel-rim, a second set of seat members, and means to hold the second set of seat members in removable engagement with the first said set of seat members and in position to support the other one of said bead elements.

3. In a wheel structure, a pair of bead elements, a series of wires having portions embracing each of the bead elements at spaced intervals, a set of seat-members adapted to fit on and extend across a wheel-rim, each of these seat-members having an outwardly turned end portion and an inwardly turned portion, the latter being formed with spaced shoulders, the outwardly turned end portion being formed with spaced grooves in which are seated the respective contiguous wire portions which embrace said bead elements, a second set of seat members, each formed with grooves to receive the contiguous bead-embracing wire portions, each of said second seat members having a portion confined between the contiguous shoulders of one of the first said seat members and means to secure the seat members of one set to those of the other set and to a wheel-rim.

4. In a wheel structure, a pair of bead elements, a series of wires having portions embracing each of the bead elements at spaced intervals, a set of seat-members adapted to fit on and extend across a wheel-rim, each of these seat-members having an outwardly turned end portion and an inwardly turned portion, the latter being apertured and formed with spaced shoulders, the outwardly turned end portion being formed with spaced grooves in which are seated the respective contiguous wire portions which embrace said bead elements, a second set of seat members, each having an aperture registering with that of one of the first said seat-members, and bolts extending through said apertures to secure said seat-members to one another and to a wheel-felly, each of said second seat-members being formed with grooves to receive the contiguous bead-embracing wire portions, each of said second seat-members having a portion confined between the contiguous shoulders of one of the first said seat-members.

5. The structure defined by claim 1, the loops of a number of said wires being seated against said spacing means and co-acting therewith and with said seats to prevent circumferential shifting of the bead-elements.

In testimony whereof I have hereunto set my hand.

GILBERT N. WIDENHOFER.